United States Patent
Sanematsu et al.

(10) Patent No.: US 7,304,407 B2
(45) Date of Patent: Dec. 4, 2007

(54) LINEAR OSCILLATING ACTUATOR

(75) Inventors: Wataru Sanematsu, Hirakata (JP);
Satoshi Nakayama, Hirakata (JP);
Makoto Fujiwara, Ibaraki (JP);
Chizuko Mishima, Shiki (JP); Youhei Ishigami, Yokohama (JP)

(73) Assignee: Matsushita Electric Works, Ltd., Osaka (JP)

( * ) Notice: Subject to any disclaimer, the term of this patent is extended or adjusted under 35 U.S.C. 154(b) by 297 days.

(21) Appl. No.: 11/013,448

(22) Filed: Dec. 17, 2004

(65) Prior Publication Data

US 2005/0140219 A1 Jun. 30, 2005

(30) Foreign Application Priority Data

Dec. 26, 2003 (JP) ............... 2003-435219

(51) Int. Cl.
*H02K 33/00* (2006.01)
(52) U.S. Cl. .............. 310/36; 310/12; 310/15; 310/21
(58) Field of Classification Search ........... 310/12–15, 310/21, 36; 30/43.9, 43.92
See application file for complete search history.

(56) References Cited

U.S. PATENT DOCUMENTS

| 5,632,087 | A | * | 5/1997 | Motohashi et al. | ........ | 30/43.92 |
| 5,921,134 | A | * | 7/1999 | Shiba et al. | ........ | 74/110 |
| 6,991,217 | B2 | * | 1/2006 | Shimizu et al. | ........ | 251/284 |

FOREIGN PATENT DOCUMENTS

| EP | 0 674 979 A1 | 10/1995 |
| JP | 59-77641 | 5/1984 |
| JP | 04-297312 | 10/1992 |
| JP | 06-017863 | 1/1994 |

(Continued)

OTHER PUBLICATIONS

Korean Examination Report dated Sep. 14, 2006 with English translation.

(Continued)

*Primary Examiner*—Thanh Lam
(74) *Attorney, Agent, or Firm*—Rader, Fishman & Grauer PLLC

(57) ABSTRACT

A linear oscillating actuator gives a smooth reciprocatory movement with a minimum of incidental vibrations or stresses. The actuator includes an oscillator carrying a permanent magnet as well as an output shaft which is adapted to be connected to drive a load, and a stator assembly carrying an electromagnet. The electromagnet generates a magnetic field which interacts with the permanent magnet to reciprocate the oscillator relative to the stator assembly in a linear path. A spring link is provided to resiliently support the oscillator to the stator assembly with a gap distance left therebetween for allowing the oscillator to reciprocate in the linear path. The spring link is configured to deform resiliently also in a direction other than along the linear path so as to allow the oscillator to move to and away from the stator assembly or to twist relative to the stator assembly. Thus, the spring link can absorb incidental stresses or displacements from which the oscillator may suffer in the directions other than along the linear path, assuring to give a smooth reciprocatory movement to the oscillator with a minimum of fatigue accumulated in the spring link.

14 Claims, 4 Drawing Sheets

FOREIGN PATENT DOCUMENTS

| | | |
|---|---|---|
| JP | 07-185151 | 7/1995 |
| JP | 07-265559 | 10/1995 |
| JP | 08-323061 | 12/1996 |
| JP | 11-193845 | 7/1999 |
| JP | 2003-134783 | 5/2003 |
| JP | 2003-348813 | 12/2003 |

OTHER PUBLICATIONS

Japanese Examination Report for Application No. 2003-435219 dated Jul. 18, 2006 with English Translation.

* cited by examiner

LINEAR OSCILLATING ACTUATOR

TECHNICAL FIELD

The present invention is directed to a linear oscillating actuator with an oscillator movably supported to a stator assembly by means of a spring link.

BACKGROUND ART

EP 0 674 979 A discloses a linear oscillating actuator utilized for driving inner cutters of a dry shaver. The actuator is composed of a stator assembly carrying an electromagnet, and an oscillator carrying a permanent magnet. The oscillator is movably supported to reciprocate in a linear path relative to the stator assembly by an interaction with the electromagnet and the permanent magnet. The stator assembly includes a stator core and a frame which projects on top of the stator core for suspending the oscillator upwardly of the stator core with a magnetic gap therebetween. In order to suspend and also to movably support the oscillator, leaf springs are utilized to connect the oscillator to the frame. Although the leaf springs are sufficiently resilient to allow the movement of the oscillator along the linear path, they are rigid in directions other than along the linear path. In view of that the linear movement of the oscillator may sometimes accompany minor displacements in the directions other than along the linear path, the leaf spring are likely to suffer from undue stresses resulting from the displacements. In this sense, the above actuator is found not satisfactory to absorb incidental vibrations associated with such displacements.

DISCLOSURE OF THE INVENTION

In view of the above problem, the present invention has been accomplished to provide a linear oscillating actuator which is capable of giving a smooth reciprocator movement with a minimum of incidental vibrations or stresses. The actuator in accordance with the present invention includes an oscillator carrying a permanent magnet as well as an output shaft which is adapted to be connected to drive a load, and a stator assembly carrying an electromagnet. The electromagnet generates a magnetic field which interacts with the permanent magnet to reciprocate the oscillator relative to the stator assembly in a linear path. A spring link is provided to resiliently support the oscillator to the stator assembly with a gap distance left therebetween for allowing the oscillator to reciprocate in the linear path. The spring link is configured to deform resiliently also in a direction other than along the linear path so as to allow the oscillator to move to and away from the stator assembly or to twist relative to the stator assembly about a gap axis running along the gap distance. Thus, the spring link can absorb incidental stresses or displacements from which the oscillator may suffer in the directions other than along the linear path, assuring to give a smooth reciprocatory movement to the oscillator with a minimum of fatigue accumulated in the spring link.

This is particularly advantageous when the oscillator is lifted above the stator assembly by means of the spring link. For instance, when the two spring links are provided to connect opposite ends of the oscillator respectively to the stator assembly, the two spring links project upwardly from the stator assembly to lift the oscillator above the stator assembly. In this case, the spring link is susceptible to a compressive or torsional force from the oscillator accompanied with the linear reciprocatory movement, and can absorb such incident stresses for smooth reciprocatory movement.

Preferably, the spring link is configured to deform resiliently in a gap direction of varying the gap distance for absorbing the compressive stress which may act on the spring link during the reciprocatory movement of the oscillator.

For this purpose, the sprig link may be shaped into a bow strip connected at its opposite ends to the oscillator and the stator assembly. Also, the spring link may be in the form of a strip of which width is greater towards its opposite ends than at its center. Further, the spring link may be formed at its connection to the oscillator with a resilient section responsible for resilient deformation in the gap varying direction. Alternatively, the spring link may be formed at its intermediate portion between the opposite ends thereof with a folded section responsible for the resilient deformation in the gap varying direction.

The spring link may be molded together with a molded part of the oscillator for reducing the number of components.

In case a parallel pair of oscillators are supported commonly to the stator assembly to reciprocate in a reverse phase relation with each other, the oscillators are interconnected to each other by means of a coupler spring for assisting the reverse phase relation. The coupler spring is resiliently deformed along the linear path as well as the gap varying direction for giving the function of absorbing the incidental stresses also by the coupler spring. In this version, the spring link and the coupler spring may be integrally molded together with a molded part of the oscillator for minimizing the number of components.

Further, the spring link may be configured to twist resiliently about its lengthwise axis for absorbing the torsional stresses acting on the spring link during the reciprocatory movement of the oscillator.

These and still other advantageous features of the present invention will become more apparent from the following description of the preferred embodiments when taken in conjunction with the attached drawings.

BEST MODES FOR CARRYING OUT THE INVENTION

Figure 1:
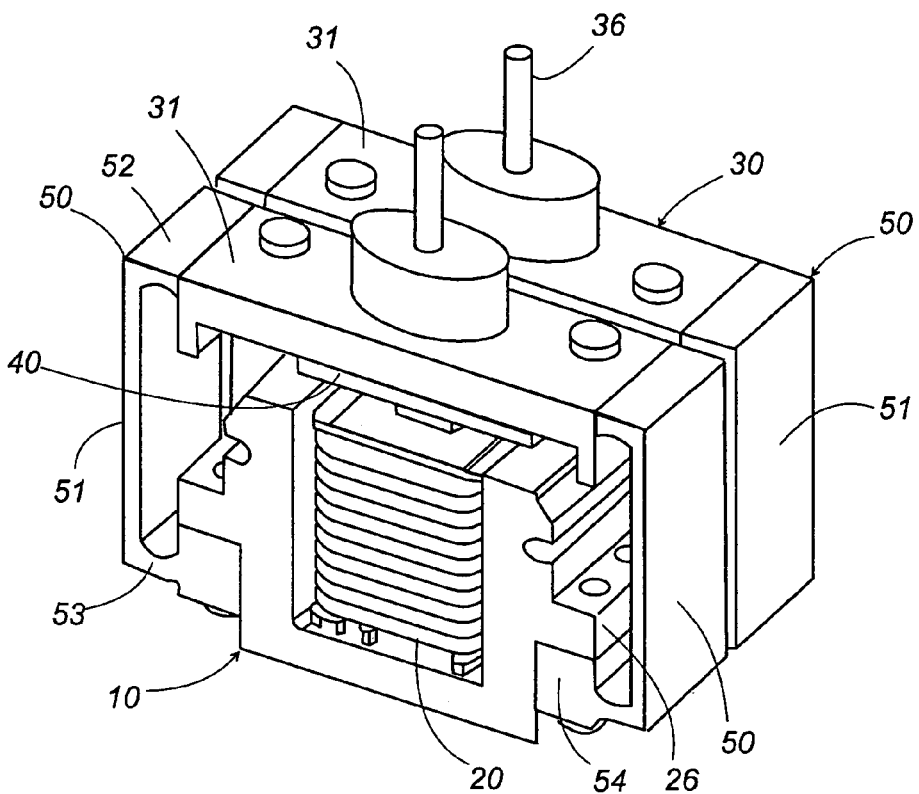
FIG. 1 is a perspective view of a linear oscillating actuator in accordance with a preferred embodiment of the present invention.
Figure 2:
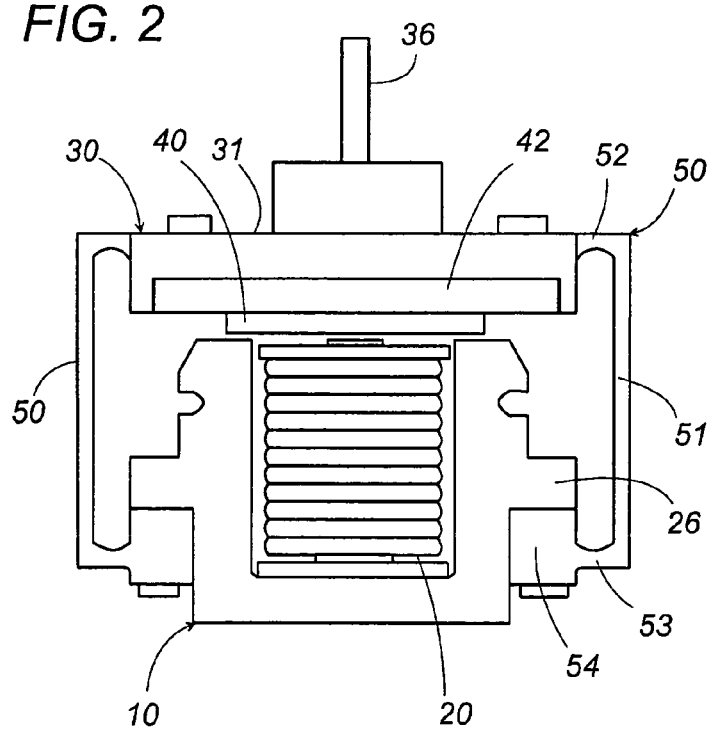
FIG. 2 is a front view of the actuator.
Figure 3:
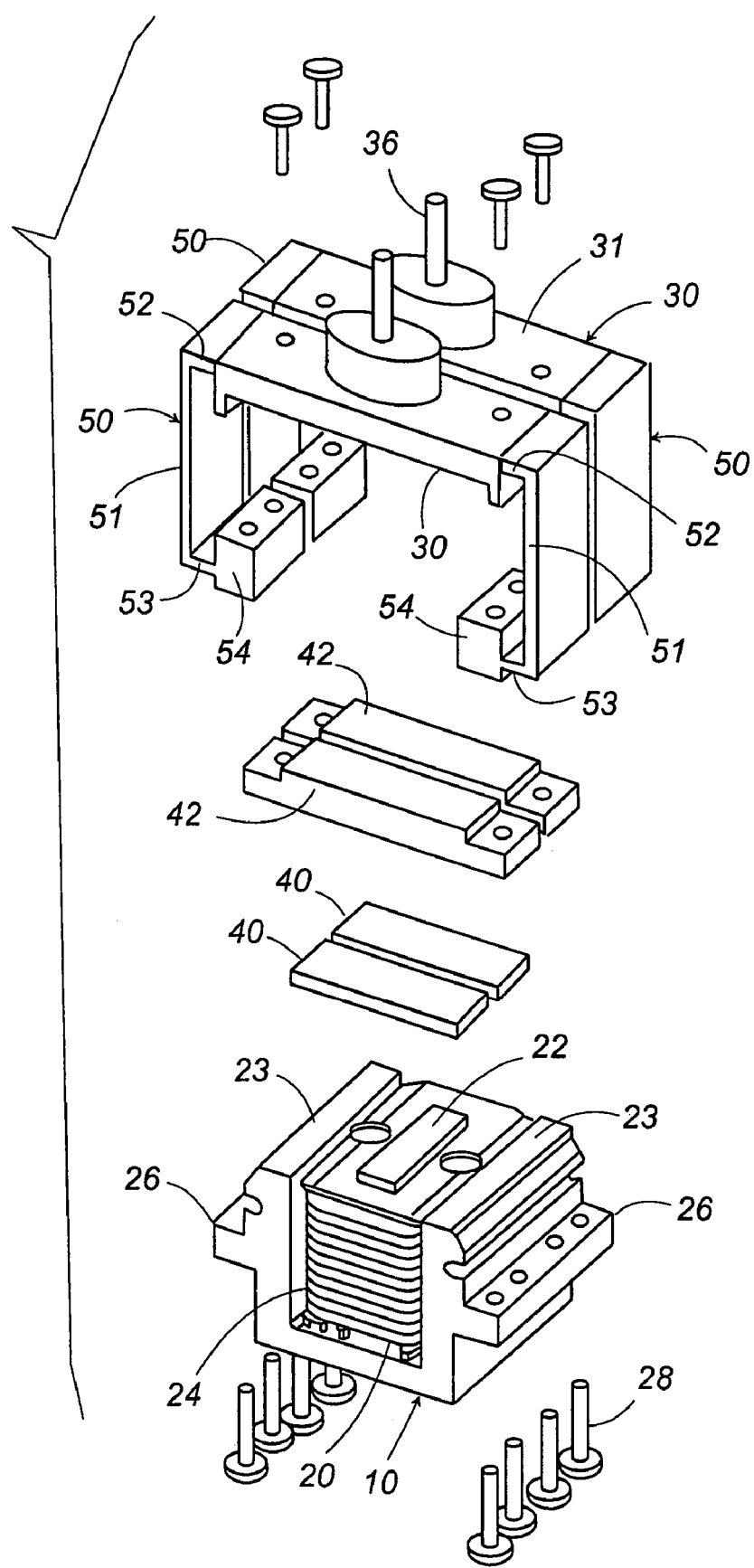
FIG. 3 is an exploded perspective view of the actuator.

Referring now to FIGS. 1 to 3, there is shown a linear oscillating actuator in accordance with a preferred embodiment of the present invention. The actuator includes two oscillators 30 commonly supported to a single stator assembly 10 to reciprocate in a reverse phase relation with each other, although the present invention is not limited thereto and may includes a single or more than two oscillators common to the one stator assembly 10.

The stator assembly 10 carries an electromagnet 20, while each oscillator 30 carries a permanent magnet 40 as well as an output shaft 36 for connection to a load to be driven to reciprocate in a linear path. For instance, the actuator may be incorporated in a dry shaver to reciprocate inner cutters relative to an outer cutter. The electromagnet 20 includes an E-shaped stator having a center core 22 and a pair of side cores 23. A coil 24 is wound around the center core 22 to magnetize pole ends at the respective upper ends of the center and side cores to opposite polarity upon being energized.

Each oscillator 30 is molded with a plastic material into a horizontally extending bar 31 having the output shaft 36 extending from its top center. The permanent magnet 40 is backed-up by a magnetic yoke 42 secured to the bottom of the bar 31. Each oscillator 30 is movably supported to the stator assembly 10 by means of spring links 50 so as to position the permanent magnet 40 just above the cores of the electromagnet 20 with a small magnetic gap therebetween. Upon being supplied with an alternating current, the electromagnet 20 generates an alternating magnetic field which interacts with the permanent magnets 40 for reciprocating the oscillator 30 relative to the stator assembly 10 in the respective linear paths. The permanent magnets 40, each in the form of a horizontally extending flat bar, are magnetized to opposite directions so that the oscillators 30 are driven in a counter reciprocating manner, i.e., in the reveres phase relation with each other.

Figure 4:
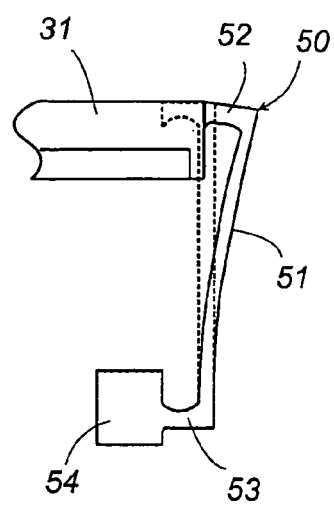
FIG. 4 is a partial view of the actuator.

The spring links 50 depend respectively from the opposite lengthwise end of the bar 31 and are fixed at their lower ends to flanges 26 integrally projecting from the side cores 23, whereby the oscillator 30 is lifted above the stator assembly 10 and is allowed to reciprocate in the linear path by resiliently deforming the spring links 50. The spring link 50 is molded into a single integrated structure composed of a vertical strip 51 and upper and lower bridges 52 and 53 extending horizontally from the upper and lower ends of the strip 51. The upper bridge 52 is bonded to the lengthwise end of the bar 31, while the lower bridge 53 terminates at a thickened mount 54 fastened to the flange 26 by pins 28. The strip 51 and the bridges 52 and 53 are responsible for imparting resiliency to the spring link 50 with respect to the direction along the linear path as well as along a gap distance between the permanent magnet and the electromagnet 20, as best shown in FIG. 4. Thus, the spring link 50 can absorb the incidental displacement of the oscillator 30 which may be associated with the reciprocatory movement thereof.

Described hereinafter are other embodiments in which the spring links are configured to deform resiliently for absorbing the incidental displacement as well. Like parts are designated by like reference numerals and no duplicate explanation is deemed necessary.

Figure 5:
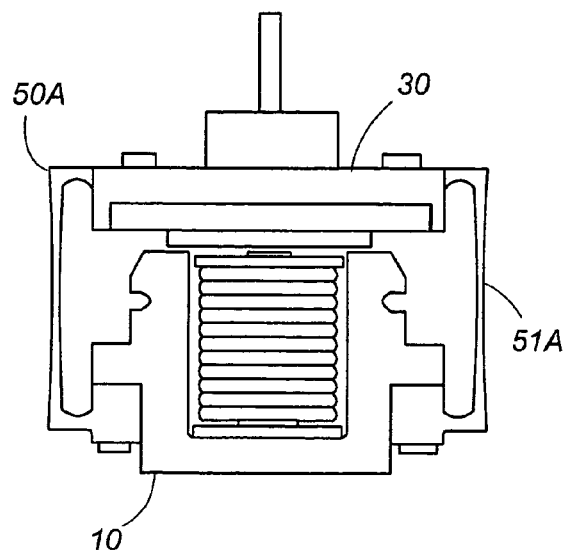
FIGS. 5 to 8 are front views respectively showing the actuators in accordance with other preferred embodiments of the present invention

In the embodiment of FIG. 5, the spring link 50A includes a vertical strip 51A which is configured to give a thickness which is smaller toward its lengthwise center than at the opposite lengthwise ends.

Figure 6:
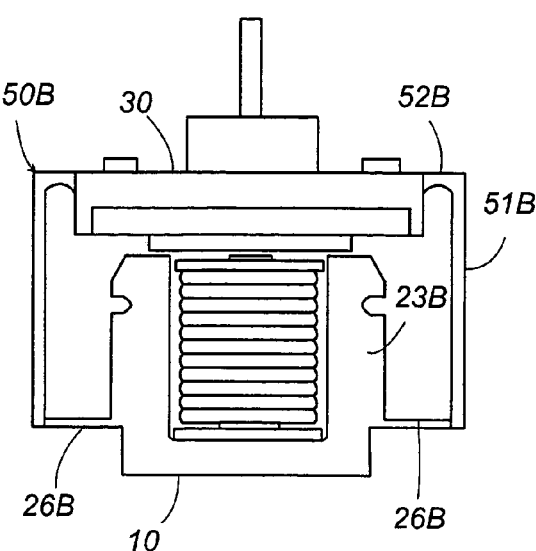

In the embodiment of FIG. 6, the spring link is shaped into an L-shaped member 50B with a like vertical strip 51B and a upper bridge 52B. In this embodiment, the flange 26B of reduced thickness projects from each side core 23B to be integrated into the lower end of the vertical strip 51B, and is cooperative with the vertical strip 51B and the upper bridge 52B to give resilient deformability with respect to the gap distance in addition to the linear path.

Figure 7:
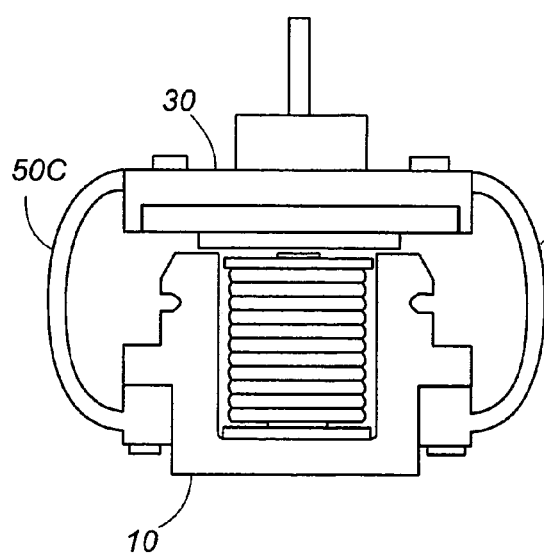

In the embodiment of FIG. 7, the sprig link is shaped into a bow strip 50C.

Figure 8:
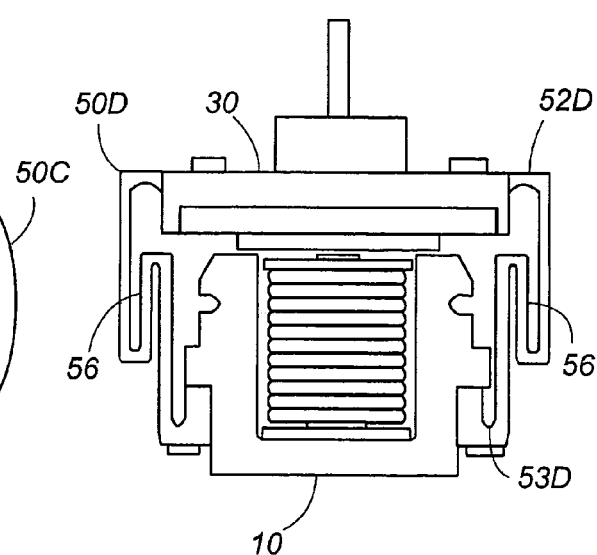

In the embodiment of FIG. 8, the spring link 50D is shaped to have a folded section 56 at its intermediate portion between the opposite lengthwise ends. With the inclusion of the folded section 56, the spring link is given capability of being resiliently deformed in its lengthwise direction, i.e., along the direction of the gap distance to a greater extent for absorbing the compressive stresses acting on the oscillator, even without relying upon the deformations of the upper and lower bridges 52D and 53D.

Figure 9:
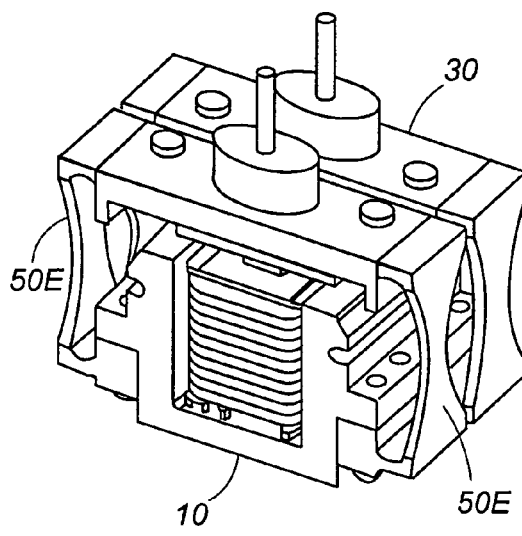
FIGS. 9 to 11 are perspective views respectively showing the actuators in accordance with still other preferred embodiment of the present invention.

In the embodiment of FIG. 9, the spring link 50E is shaped to have a width which is narrower towards its lengthwise center than at the opposite lengthwise ends.

Figure 10:
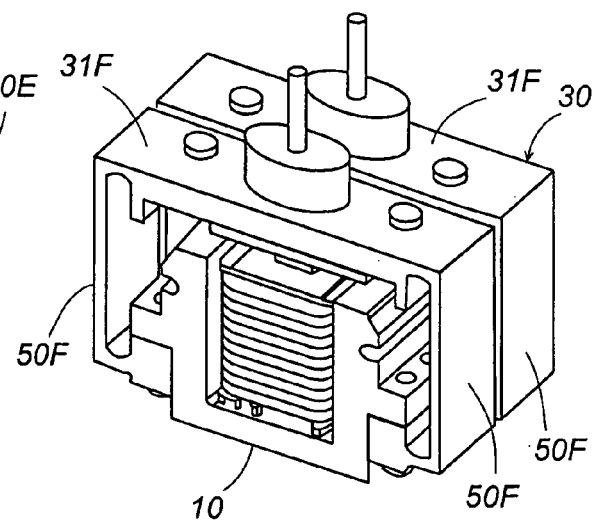

FIG. 10 illustrates a further embodiment in which the spring links 50F are molded integrally with the bar 31F of the oscillator 30 for reducing the number of components.

Figure 11:
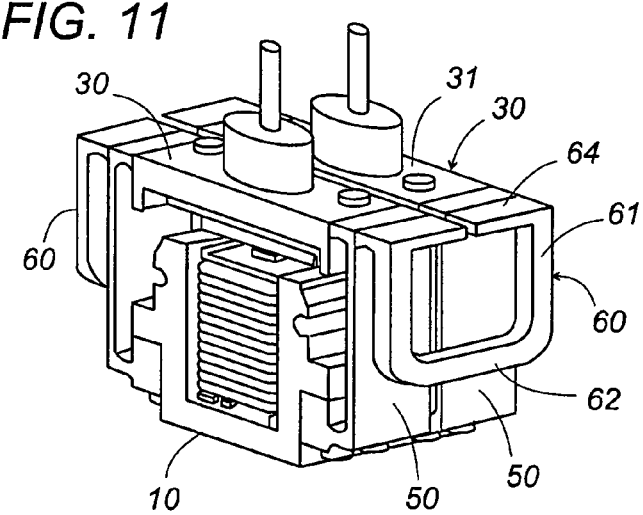

FIG. 11 illustrates a still further embodiment in which the two oscillators 30 are interconnected by means of coupler springs 60 which assist the reverse phase relation between the two oscillators. The coupler spring 60 is configured to resiliently deform, in response to the linear movement of the one of the oscillators, so as to add a resulting bias to the other oscillator moving in the opposite direction for driving the load at an optimum maximum output efficiency. The coupler spring 60 is molded from a plastic material into a U-shaped structure having legs 61 connected by a web 62, and is welded to the adjacent lengthwise ends of the oscillators 30 at joints 64 respectively formed at the upper ends of the legs 61. With the U-shaped structure, the coupler spring 60 is given resilient deformability which allows the oscillators 30 to move relative to each other in a lengthwise direction of the oscillator as well as the vertical direction. Thus, the oscillators 30 can move along the linear path as well as the gap varying direction without being restricted by the coupler springs 60. Preferably, the coupler springs 60 are integrally molded together with the spring links 50 and with the bars 31 of the oscillators 30.

Figure 12:
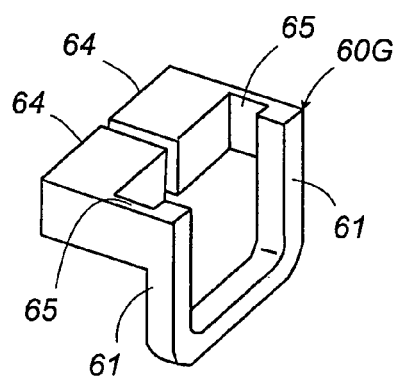
FIGS. 12 and 13 are perspective views respectively showing modifications of coupler springs applicable to the embodiment of FIG. 11.

FIG. 12 illustrates a modified coupler spring 60G which may be equally utilized to interconnect the two oscillators 30 with an added feature of absorbing a twisting displacement possibly acting over the two oscillators. For this purpose, each leg 61 is connected to the joint 64 by means of horizontal beam 65 of reduced thickness which permits the joints 64 and therefore the oscillators 30 to move laterally relative to each other. Thus, the coupler spring 60 is given a capability of affording the lateral displacement between the oscillators, in addition to the vertical displacement therebetween, thereby enabling to absorb the twisting displacement in combination of the lateral and vertical displacements, while permitting the two oscillators 30 to move towards and away from each other.

Figure 13:
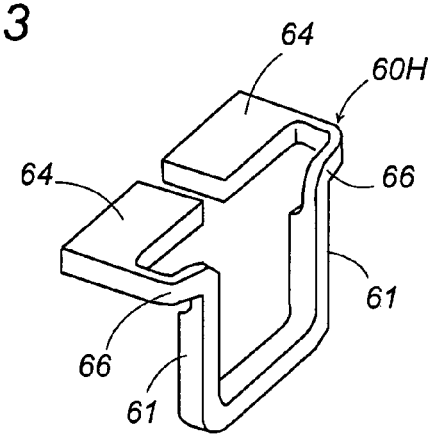

Further, as shown in FIG. 13, the coupler spring 60H may be shaped to have twisted beams 66 at the connection of the legs 61 to the joints 64 in order to effectively absorb any possible unintended displacement between the two oscillators 30. The twisted beam 66 is configured to have a reduced thickness with respect to the length as well as width directions of the oscillator to have the resilient deformability in both of the directions, and is cooperative with the given deformability in the vertical direction to absorb the unintended displacements acting between the two oscillators 30.

Figure 14:
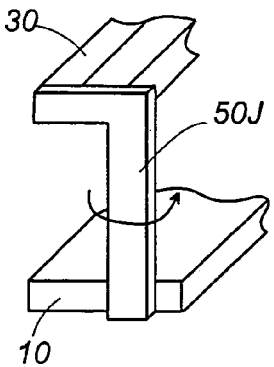
FIG. 14 is a perspective view of a portion of the actuator in accordance with a further embodiment of the present invention.

FIG. 14 illustrates a still further embodiment of the present invention in which the spring link is in the form of a torsion spring 50J which exhibits resilient torsional deformability about its lengthwise axis as indicated by an arrow in the figure, allowing the oscillator 30 to pivot about an axis along the gap distance to some extent relative to the stator assembly 10. Whereby, possible torsional displacement of the oscillator can be absorbed at the spring link 50J for assuring smooth reciprocatory movement of the oscillator 30.

The invention claimed is:

1. A linear oscillating actuator comprising:
   an oscillator carrying a permanent magnet as well as an output shaft which is adapted to be connected to drive a load;
   a stator assembly carrying an electromagnet, said electromagnet generating a magnetic field which interacts with said permanent magnet to reciprocate said oscillator relative to said stator assembly in a linear path, and
   a spring link configured to resiliently support said oscillator to said stator assembly with a gap distance left therebetween for allowing the oscillator to reciprocate in said linear path,
   wherein
      said spring link is in a form of a non-linear spring which deforms resiliently also in a direction other than said linear path so as to allow said oscillator to move to and away from said stator assembly.

2. The linear oscillating actuator as set forth in claim 1, wherein two said spring links are provided for connecting opposite ends of said oscillator respectively to said stator assembly,
   said two spring links projecting upwardly from the stator assembly to lift said oscillator above said stator assembly.

3. The linear oscillating actuator as set forth in claim 1, wherein
   said spring link is configured to deform resiliently in a gap direction of varying said gap distance.

4. The linear oscillating actuator as set forth in claim 3, wherein
   said spring link is in the form of a strip of which thickness is smaller towards its lengthwise center than at the opposite lengthwise ends.

5. The linear oscillating actuator as set forth in claim 3, wherein
   said stator assembly includes a resilient flange for connection with said spring link, said resilient flange adding resilient deformability to said spring link with respect to said gap varying direction.

6. The linear oscillating actuator as set forth in claim 3, wherein
   said spring link is in the form of a bowed strip (50C) connected at its opposite ends to said oscillator and to said stator assembly.

7. The linear oscillating actuator as set forth in claim 3, wherein
   said spring link is formed at its intermediate portion between the opposite ends thereof with a folded section responsible for the resilient deformation of said spring link in said gap varying direction.

8. The linear oscillating actuator as set forth in claim 3, wherein
   said spring link is in the form of a strip of which width is narrower towards its longitudinal center than at its longitudinal ends.

9. The linear oscillating actuator as set forth in claim 3, wherein
   said sprig link is integrally molded together with a molded part of said oscillator.

10. The linear oscillating actuator as set forth in claim 3, wherein
    a pair of said oscillators are supported to said stator assembly to reciprocate in a reverse phase relation with each other,
    said oscillators being interconnected to each other by means of coupler springs for assisting said reverse phase relation,
    said coupler springs being resiliently deformable along said linear path as well as along said gap varying direction.

11. The linear oscillating actuator as set forth in claim 10, wherein
    said spring link and said coupler spring are integrally molded together with a molded part of said oscillator.

12. The linear oscillating actuator as set forth in claim 10, wherein
    said coupler springs are resiliently deformable in a direction of allowing said two oscillators to move towards and away from each other.

13. The linear oscillating actuator as set forth in claim 1, wherein
    said spring link is configured to twist resiliently about its lengthwise axis.

14. The linear oscillating actuator as set forth in claim 1, wherein
    said non-linear link comprises a vertical strip and upper and lower bridges respectively expanding horizontally from the upper and lower ends of said vertical strip, said upper bridge being bonded to said oscillator, and said lower bridge being bonded to said stator assembly.

* * * * *